(12) United States Patent
Hunt (10) Patent No.: US 11,294,710 B2
(45) Date of Patent: Apr. 5, 2022

(54) THREAD SWITCH FOR ACCESSES TO SLOW MEMORY

(71) Applicant: ADVANCED MICRO DEVICES, INC., Sunnyvale, CA (US)

(72) Inventor: Douglas Benson Hunt, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 116 days.

(21) Appl. No.: 15/809,432

(22) Filed: Nov. 10, 2017

(65) Prior Publication Data
US 2019/0146831 A1  May 16, 2019

(51) Int. Cl.
| | | |
|---|---|---|
| *G06F 9/00* | (2006.01) | |
| *G06F 9/48* | (2006.01) | |
| *G06F 12/0875* | (2016.01) | |
| *G06F 9/46* | (2006.01) | |
| *G06F 12/0806* | (2016.01) | |
| *G06F 12/0897* | (2016.01) | |
| *G06F 12/0866* | (2016.01) | |

(52) U.S. Cl.
CPC .............. *G06F 9/485* (2013.01); *G06F 9/467* (2013.01); *G06F 12/0806* (2013.01); *G06F 12/0875* (2013.01); *G06F 12/0897* (2013.01); *G06F 12/0866* (2013.01); *G06F 2212/1024* (2013.01); *G06F 2212/205* (2013.01); *G06F 2212/311* (2013.01); *G06F 2212/6042* (2013.01)

(58) Field of Classification Search
CPC ...... G06F 9/485; G06F 9/467; G06F 12/0875; G06F 12/0897; G06F 12/0866; G06F 2212/0866; G06F 2212/1024; G06F 2212/205; G06F 2212/311; G06F 2212/6042
See application file for complete search history.

(56) References Cited

U.S. PATENT DOCUMENTS

| | | | | |
|---|---|---|---|---|
| 6,697,919 B2 * | 2/2004 | Gharachorloo | ..... | G06F 12/0826 711/141 |
| 7,149,863 B1 * | 12/2006 | Chew | .................... | G06F 9/5016 711/170 |
| 2005/0044319 A1 * | 2/2005 | Olukotun | ............ | G06F 9/30032 711/118 |
| 2006/0044934 A1 * | 3/2006 | Wong | .................. | G06F 12/0246 365/239 |

(Continued)

*Primary Examiner* — Craig S Goldschmidt (57) ABSTRACT

A processing system suspends execution of a program thread based on an access latency required for a program thread to access memory. The processing system employs different memory modules having different memory technologies, located at different points in the processing system, and the like, or a combination thereof. The different memory modules therefore have different access latencies for memory transactions (e.g., memory reads and writes). When a program thread issues a memory transaction that results in an access to a memory module having a relatively long access latency (referred to as "slow" memory), the processor suspends execution of the program thread and releases processor resources used by the program thread. When the processor receives a response to the memory transaction from the memory module, the processor resumes execution of the suspended program thread.

20 Claims, 4 Drawing Sheets

(56) References Cited

U.S. PATENT DOCUMENTS

| | | | |
|---|---|---|---|
| 2009/0113433 A1* | 4/2009 | Dunshea | G06F 9/485 718/102 |
| 2014/0075163 A1* | 3/2014 | Loewenstein | G06F 12/084 712/225 |
| 2015/0106560 A1* | 4/2015 | Perego | G06F 12/10 711/105 |
| 2017/0123969 A1* | 5/2017 | Kandasamy | G06F 12/084 |

* cited by examiner

THREAD SWITCH FOR ACCESSES TO SLOW MEMORY

BACKGROUND

Description of the Related Art

A processor typically includes at least one processor core that includes circuitry configured to execute sets of instructions. To enhance processing efficiency, some processor cores are designed to support multithreading, whereby the processor core concurrently executes different sets of instructions, referred to as program threads (or simply threads), with each thread corresponding to a different task or set of tasks and executable relatively independently of the other program threads. The different threads executing at the processor core can share resources of the core, allowing the tasks associated with the different program threads to be executed more efficiently. However, misallocation of core resources to less efficient program threads can reduce the overall throughput of the processor.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for suspending execution of a program thread at a processing system based on an access latency required for a program thread to access memory. The processing system employs different memory modules that have different memory technologies, that are located at different points in the processing system, or a combination thereof. The different memory modules therefore have different access latencies for memory transactions (e.g., memory reads and writes). When a program thread issues a memory transaction that results in an access to a memory module having a relatively long access latency (referred to as "slow" memory), the processor suspends execution of the program thread and releases processor resources used by the program thread. When the processor receives a response to the memory transaction from the memory module, the processor resumes execution of the suspended program thread. By suspending execution of and releasing processor resources allocated to a program thread based on accesses to slow memory, the processor improves the likelihood that other program threads executing on the same processor will execute instructions faster by using the resources released by the suspended thread, improving overall processing efficiency.

To illustrate via an example, in some embodiments a processing system employs random access memory (RAM) modules to store data at lower levels of a memory hierarchy, and in particular employs the RAM modules to form one or more data caches. The RAM modules are "fast" memory in that they have relatively short access latencies for memory transactions, but are also relatively low-density memory modules. In addition to the RAM modules, the processing system employs non-volatile memory modules (e.g., flash memory) (also referred to as "nonvolatile" memory modules) at a higher level of the memory hierarchy, and in particular employs the flash memory to form the "main memory" that stores all the data that is directly accessible by memory transactions of the processing system. The flash memory modules are slow memory modules that have relatively long access latencies compared to the RAM modules, but are relatively high-density memory modules. The processing system further employs a processor core to execute program threads. Conventionally, when a program thread issues a memory transaction that results in an access to the flash memory, processor resources (such as entries of a scheduler queue) remain assigned to the program thread as the processor core awaits the response from the flash memory. In contrast, by employing the techniques described herein, the processing system suspends execution of the program thread that accesses the flash memory, thereby allowing resources assigned to the program thread to be employed by other program threads, thus improving processing efficiency.

Figure 1:
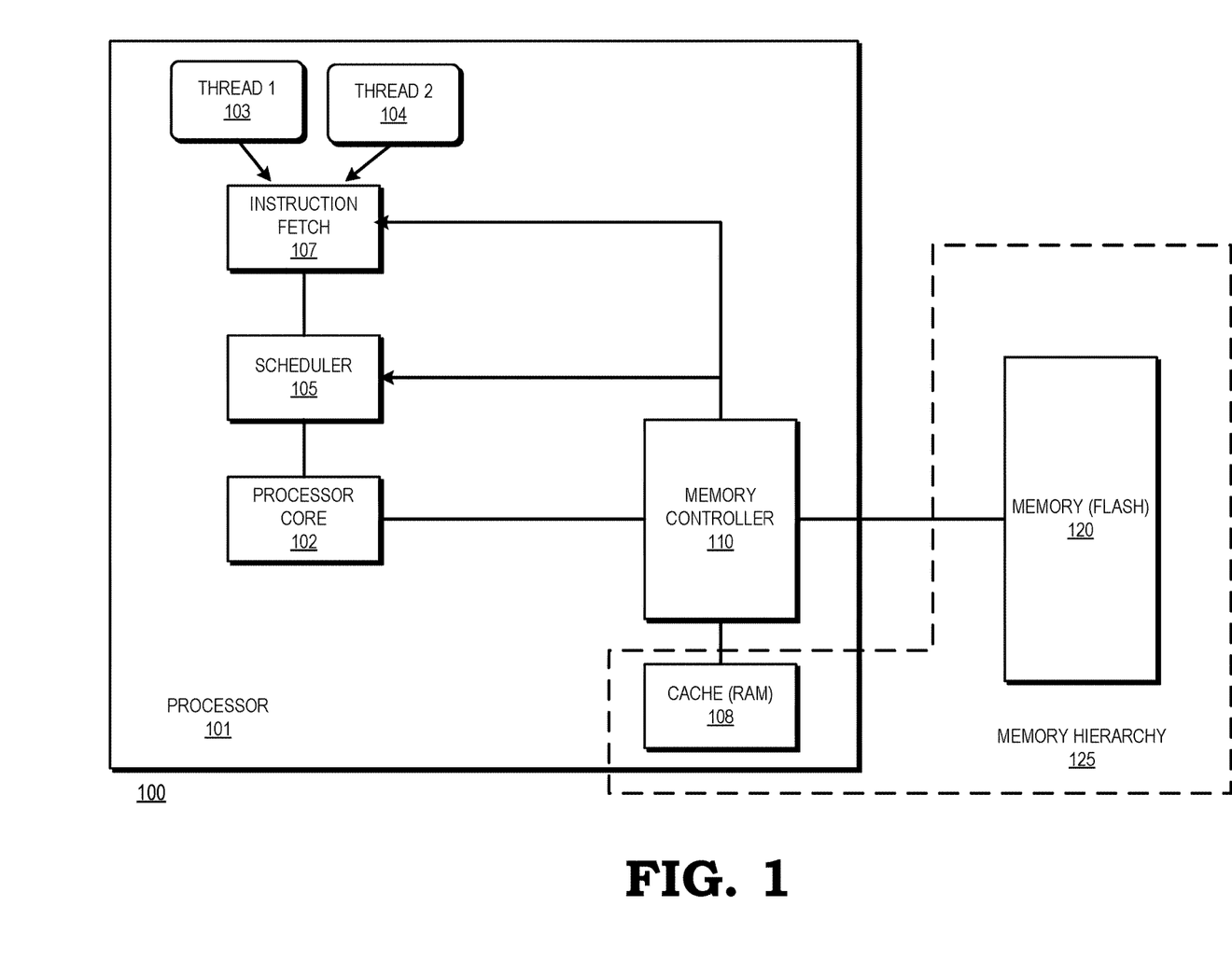
FIG. 1 is a block diagram of a processing system that suspends execution of a program thread based on a type of memory accessed by the program thread in accordance with some embodiments.

Turning to the figures, FIG. 1 illustrates a block diagram of a processing system 100 in accordance with some embodiments. The processing system 100 is generally configured to execute sets of instructions (e.g., computer programs) to carry out specified tasks for an electronic device. Accordingly, the processing system 100 is implementable in any of a variety of electronic devices, such as a desktop or laptop computer, a server, a smartphone, a tablet, a game console, and the like. To support execution of instructions, the processing system 100 includes a processor 101 and memory 120. The processor 101 is generally configured to execute the sets of instructions on behalf of the processing system 100.

To support execution of instructions, the processor 101 includes a processor core 102, a scheduler 105, an instruction fetch unit 107 and a memory controller 110. It will be appreciated that in some embodiments the processor 101 includes additional modules (not illustrated at FIG. 1) to support execution of instructions, such as additional processor cores, input/output controllers, one or more graphics processing units (GPUs), memory controllers, and the like. The processor core 102 includes an instruction pipeline to execute instructions on behalf of the processor 101. In particular, the processor core 102 is configured to decode instructions into one or more operations, issue the operations to one or more execution units, execute the operations at the one or more execution units, and retire fetched instructions in response to completion of the associated operations.

In the example of FIG. 1, it is assumed that the processor core 102 is a multithreaded processor core. That is, the processor core 102 is configured to concurrently execute multiple program threads. As will be appreciated by one skilled in the art, each program thread (also referred to simply as a thread) is a process or portion of a process instantiated by a computer program that is executed by the processor core 102 relatively independently of other threads. In the depicted example, the processor core 102 executes two threads, designated thread 103 and thread 104. In some embodiments, threads 103 and 104 are different portions of the same process, while in other embodiments each of the threads 103 and 104 are portions of different processes instantiated by different computer programs.

To support multithreaded execution of threads 103 and 104, the processor 101 employs the instruction fetch unit 107 and the scheduler 105. The instruction fetch unit 107 is configured to fetch instructions from an instruction buffer (not shown) for the threads 103 and 104 and store them at a buffer of the scheduler 105. The scheduler 105 selects the fetched instructions from the buffer and provides the selected instructions to the processor core 102 for execution. In some embodiments, the instruction fetch unit 107 and scheduler 105 are configured to fetch and store instructions for the threads 103 and 104 according to a specified priority scheme. For example, in some embodiments, when both of the threads 103 and 104 are in active (non-suspended) states, the scheduler 105 is configured to assign an equal number of buffer slots to each of the threads 103 and 104. In response to determining that all of the buffer slots for a given thread are full (that is, all of the slots store an instruction awaiting execution at the processor core 102), the scheduler 105 signals the instruction fetch unit 107 to stop fetching instructions for that thread until a buffer slot becomes available. In some embodiments, the scheduler 105 assigns different numbers of buffer slots to different program threads based on priority values for each program thread.

In addition, as described further herein, the processor 101 places a thread in a suspended state in certain situations, wherein the instruction fetch unit 107 does not fetch instructions for the suspended thread. In addition, the scheduler 105 frees at least some of the buffer slots to store instructions of active, non-suspended threads. In at least some embodiments, the scheduler 105 frees only those buffer slots that store instructions that are dependent on, or a later in a program order than, an instruction that resulted in the thread being suspended.

To further support execution of instructions, the processing system 100 is configured to support a memory hierarchy 125, which includes the cache 108 and the memory 120. The memory hierarchy 125 is generally configured to incorporate different levels, with cache 108 forming the lowest level and the memory 120 forms the highest level of the memory. In some embodiments, the processing system 100 includes additional caches (not shown) to form additional levels of the memory hierarchy 125.

The memory controller 110 is configured to facilitate access of the memory hierarchy 125 by the processor core 102. In particular, while executing instructions of the threads 103 and 104, the processor core 102 generates operations, referred to as memory transactions, to access data at the memory hierarchy 125. Examples of memory transactions include read operations to read data from the memory hierarchy 125 and write transactions to write data to the memory hierarchy 125. The processor core 102 provides each memory transaction to the memory controller 110, which manages processing of each memory transaction at the memory hierarchy 125.

To illustrate, in response to receiving a memory transaction targeted to a given memory address, the memory controller 110 determines if an entry of the cache 108 stores data associated with the memory address. If so, the memory controller 110 satisfies the memory transaction at the cache 108 by writing data to the entry (in the case of a write operation) or by retrieving data from the entry (in the case of a read operation). If the cache 108 does not include an entry associated with the memory address, the memory controller 110 identifies a cache miss and, in response, proceeds to the next-higher level of the memory hierarchy 125 and determines if that level includes an entry that stores data associated with the memory address. If so, the memory controller 110 transfers the data from the identified entry to the cache 108, where it satisfies the memory transaction.

If the level of the memory hierarchy 125 does not include an entry that stores data associated with the memory address, the memory controller 110 proceeds to the next level of the memory hierarchy 125. The memory controller 110 proceeds in this fashion until it either locates an entry that stores data associated with the memory address at a lower level of the memory hierarchy 125, or until it reaches the highest level—that is until it reaches memory 120. In the example of FIG. 1, the memory 120 is configured as main memory for the processing system 100, such that the memory 120 stores all data that is available to satisfy memory transactions. Accordingly, when a memory transaction reaches the memory 120 as it traverses the memory hierarchy 125, the memory controller 110 retrieves the data associated with the memory address from the memory 120, copies the received data to the cache 108, and satisfies the memory transaction at the cache 108.

In the illustrated embodiment of FIG. 1, the cache 108 stores data at a set of one or more RAM memory modules. Accordingly, the cache 108 is accessible by the memory controller 110 relatively quickly. In contrast, the memory 120 includes a set of one or more flash memory modules that can have a relatively long access latency for the memory controller 110. To prevent the relatively long access latency of the memory 120 from impacting processing efficiency, the processor 101 suspends execution of threads that access the memory 120.

To illustrate, in response to a cache miss that results in provision of a memory transaction to the memory 120, the memory controller 110 provides to the instruction fetch unit 107 and the scheduler 105 an indication of the thread that generated the memory transaction. In response, the instruction fetch unit 107 suspends execution of the indicated thread by not fetching any more instructions for that thread until the instruction fetch unit 107 receives an indication to resume execution of the thread. In addition, the scheduler 105 frees the buffer slot corresponding to the instruction that resulted in the memory transaction to the memory 120, and frees the buffer slots for any instructions of the suspended thread that follow in the program order. The freed slots are therefore available to store instructions for other, active threads, improving instruction throughput at the processor core 102.

In response to receiving a response to the memory transaction from the memory 120, the memory controller 110 signals the instruction fetch unit 107. In response the instruction fetch unit 107 resumes fetching instructions of the indicated thread beginning with the instruction which generated the memory access that caused the thread to be suspended.

It will be appreciated that, in the embodiment of FIG. 1 the processor 101 suspends execution of a thread based on the level of the memory hierarchy 125 accessed by a memory transaction associated with the thread, and in particular suspends execution of a thread when the memory transaction reaches a level of the memory hierarchy 125 corresponding to slow memory modules. Thus, the processor 101 does not suspend execution of a thread when the thread generates a memory transaction that is satisfied at the cache 108 without reaching the memory 120.

Figure 2:
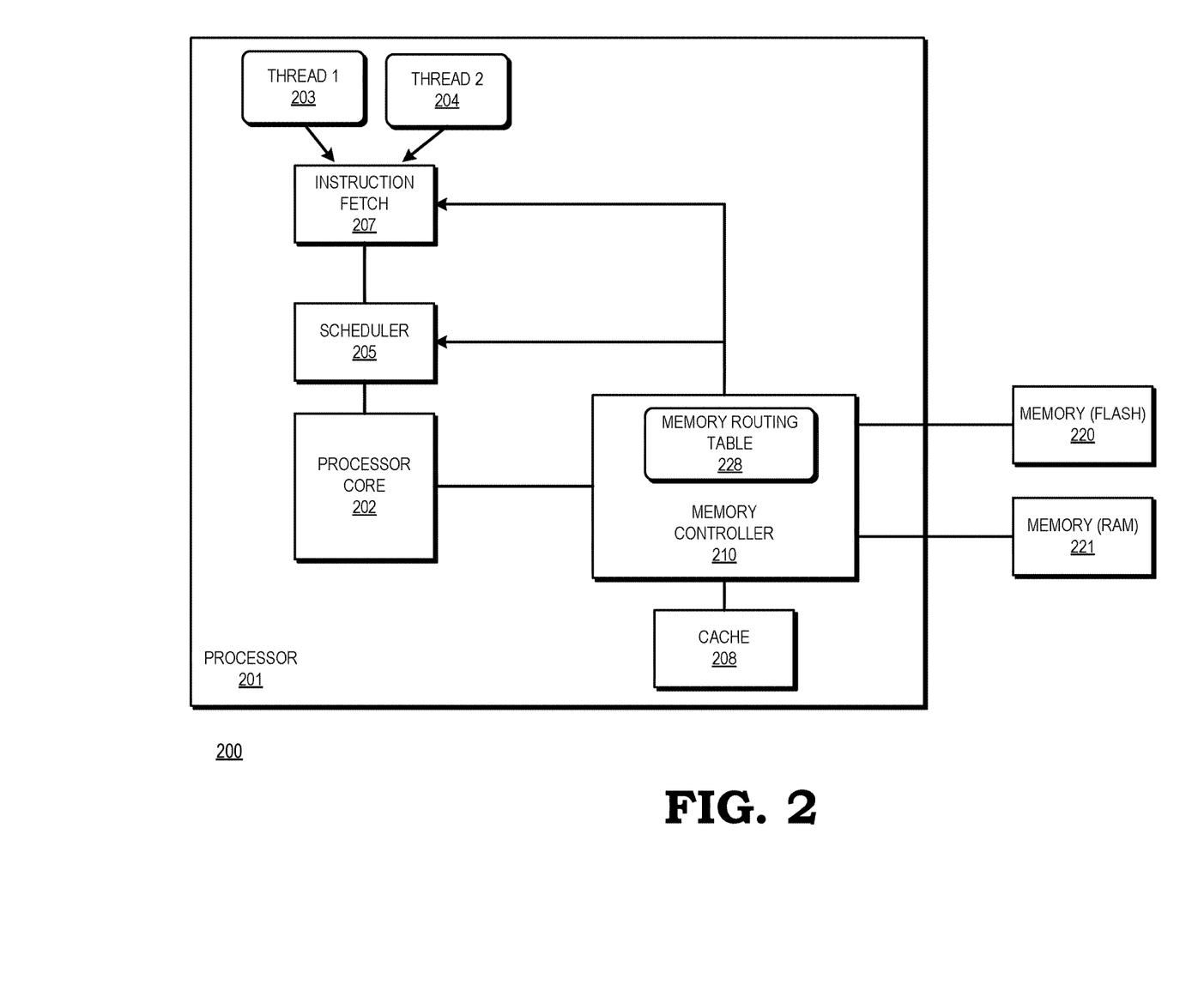
FIG. 2 is a block diagram of another processing system that suspends execution of a program thread based on a type of memory accessed by the program thread in accordance with some embodiments.

FIG. 2 is a block diagram of a processing system 200 that suspends execution of a thread based on a memory routing table, rather than on a level of a memory hierarchy, in accordance with some embodiments. In the illustrated example, the processing system 200 includes a processor 201 having a processor core 202, a scheduler 205, an instruction fetch unit 207, and a cache 208. Each of the processor core 202, the scheduler 205, the instruction fetch unit 207, and the cache 208 are configured similarly to the corresponding modules of the processor 101 of FIG. 1, and in particular are configured to support execution of program threads 203 and 204.

The processing system 200 also includes a memory 220 having one or more flash memory modules, and memory 221 having one or more RAM modules. In some embodiments, the memory 220 and 221 together form the main memory in a memory hierarchy for the processing system 200. That is, the main memory level of the memory hierarchy for the processing system 200 includes memory modules of different types.

To identify which of the memories 220 and 221 stores data associated with each memory address, the memory controller 210 employs a memory routing table 228. In some embodiments, the memory routing table 228 includes an entry for each memory address of a memory address space, with each entry indicating which of the memories 220 and 221 stores data associated with the corresponding address. Thus, for example, one entry of the memory routing table 228 indicates that a memory address A is associated with the memory 220 and another entry of the memory routing table 228 indicates that a different memory address B is associated with memory 221.

In response to receiving a memory transaction, the memory controller 210 initially determines if the cache 208 stores data associated with the memory address of the memory transaction. If so, the memory controller 210 satisfies the memory transactions at the cache 208. If the cache 208 does not store data associated with the memory address, the memory controller accesses the memory routing table 228 to identify which of the memories 220 and 221 is associated with the memory address and provides the memory address to the identified memory. In response, the identified memory provides the data associated with the memory address to the memory controller 210, which in turn stores the data at the cache 208. The memory controller 210 then satisfies the memory transaction at the cache 208.

As indicated above, the memory 220 is flash memory having a relatively slow response rate to memory transactions, and the memory 221 is RAM module having a relatively fast response rate. Accordingly, in response to identifying, based on the memory routing table 228, that a memory transaction is to be provided to the memory 220, the memory controller 210 signals the instruction fetch unit 207 and the scheduler 205 to suspend execution of the thread that generated the memory transaction. In response, the instruction fetch unit 207 suspends execution of the indicated thread by not fetching instructions for the suspended thread until the suspended thread returns to an active, non-suspended state. Further, as in the example of FIG. 1, the scheduler 205 frees buffer slots that store the instruction that resulted in suspension of the thread and buffer slots that store instructions of the suspended thread that follow in a program order. In response to receiving a response to the memory transaction from the memory 220, the memory controller 210 signals the instruction fetch unit 207. In response the instruction fetch unit 207 resumes execution of the indicated thread by resuming fetching of instructions for the indicated thread.

It will be appreciated that in some embodiments the memories 220 and 221 have the same memory technology (e.g. both are sets of RAM modules) but have different access latencies for another reason. For example, in some embodiments the memory 220 is located more remotely from the processor 201 than the memory 221. That is, communications between the memory controller 210 and the memory 220 must traverse a greater number of signal lines, interconnects, buffers, or other circuitry, as compared to the memory 221, such that the access latency for the memory 220 by the memory controller 210 is greater than the access latency for the memory 221. Thus, the processor 201 suspends execution of a thread based on memory access latency, whether the memory access latency is based on memory access technology of a memory module, the location of the memory module at the processing system 200, and the like, or a combination thereof.

Figure 3:
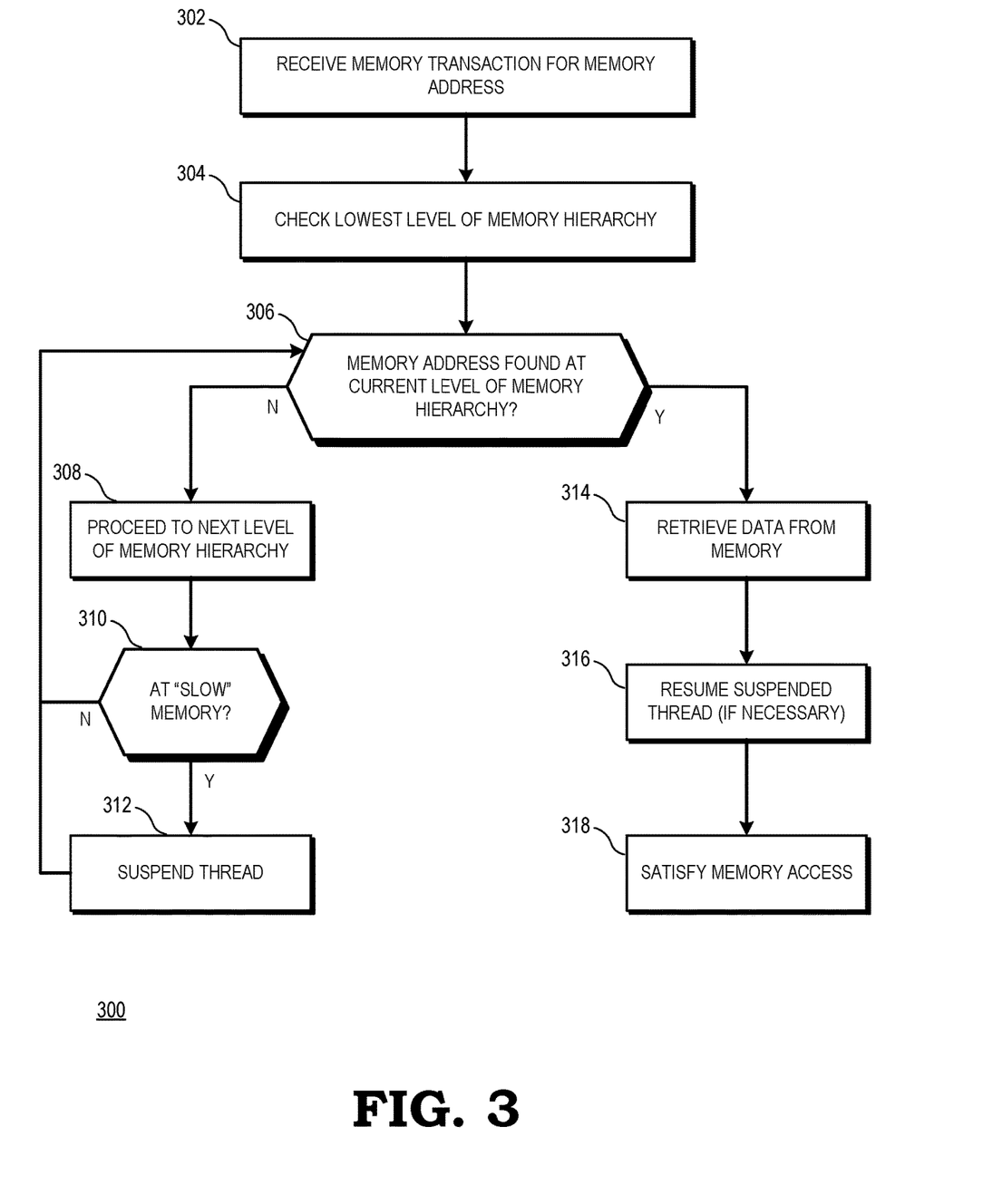
FIG. 3 is a flow diagram of a method of suspending execution of a program thread based on a level of a memory hierarchy accessed by the program thread in accordance with some embodiments.

FIG. 3 depicts a flow diagram of a method 300 of suspending execution of a program thread based on a level of a memory hierarchy accessed by the program thread in accordance with some embodiments. The method 300 is described with respect to an example implementation at the processing system 100 of FIG. 1. At block 302, the memory controller 110 receives a memory transaction. For purposes of the example implementation, it is assumed that the memory transaction was generated by the thread 103.

At block 304, the memory controller 110 accesses the lowest level of the memory hierarchy 125; that is, cache 108. At block 306, the memory controller 110 determines if data associated with the memory address of the memory transaction is stored at that level of the memory hierarchy 125. If not, the method flow moves to block 308 and the memory controller 110 proceeds to the next level of the memory hierarchy 125. At block 310 the memory controller 110 identifies whether it has reached a level of the memory hierarchy corresponding to slow memory; that is, in the example of FIG. 1, whether the memory controller 110 has reached the memory 120. If not, the method flow returns to block 306. If, at block 310, the memory controller 110 has identified that it has reached a slow memory level of the memory hierarchy 125, the method flow proceeds to block 312 and the memory controller 110 signals the instruction fetch unit 107 and scheduler 105 to suspend execution of the thread 103 at the processor core 102. The method flow returns to block 306.

At block 306, in response to the memory controller 110 identifying that the current level of the memory hierarchy stores data associated with the memory address, the method flow moves to block 314 and the memory controller 110 retrieves the data from the current level of the memory hierarchy. At block 316, if the thread 103 was previously suspended (because the memory controller 110 reached the memory 120 in the memory hierarchy 125), the memory controller 110 signals the instruction fetch unit 107 to resume execution of the thread 103. At block 318 the memory controller satisfies the memory access at the cache 108.

Figure 4:
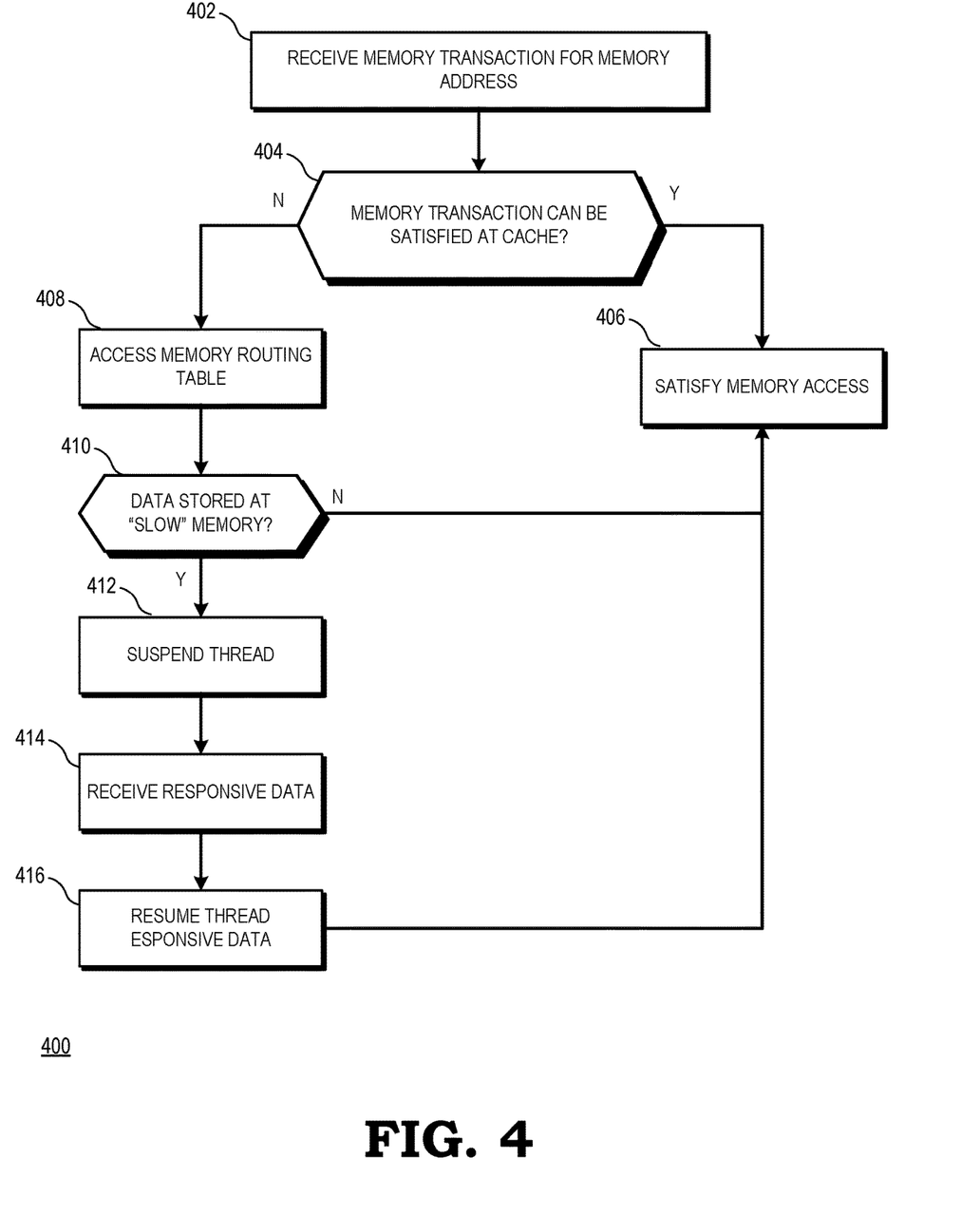
FIG. 4 is a flow diagram of a method of suspending execution of a program thread based on a memory routing table in accordance with some embodiments.

FIG. 4 illustrates a block diagram of a method 400 of suspending execution of a program thread based on a memory routing table in accordance with some embodiments. The method 400 is described with respect to an example implementation at the processing system 200 of FIG. 2. At block 402 the memory controller 110 receives a memory transaction. For purposes of the example, it assumed that the memory transaction is generated by the thread 204.

At block 404, the memory controller 210 determines if the memory transaction can be satisfied at the cache 208. If so, the method flow moves to block 406 and the memory controller 210 satisfies the memory access. If, at block 404, the memory controller 210 determines that the memory transaction cannot be satisfied at the cache 208, the method flow moves to block 408 and the memory controller 210 accesses the memory routing table 228 to identify which of the memories 220 and 221 is associated with the memory address of the memory transaction.

At block 410 the memory controller 210 determines whether the memory routing table 228 indicates that the memory address is associated with slow memory—that is, whether the memory routing table 228 indicates that the memory address is associated with the memory 220. If not—that is, if the memory routing table indicates that the memory address is associated with the memory 221—the method flow moves to block 406 and the memory controller 210 satisfies the memory access from the memory 221.

Returning to block 410, if the memory controller 210 determines that the data associated with the memory address is stored at the memory 220 (the slow memory), the method flow moves to block 412 and the memory controller 210 signals the instruction fetch unit 207 and scheduler 205 to suspend execution of the thread 204 at the processor core 202. At block 414, the memory controller 210 receives data responsive to the memory transaction from the memory 220. In response, at block 416 the memory controller 210 signals the instruction fetch unit 207 to resume fetching instructions of the thread 204. The method flow moves to block 406 and the memory controller 210 satisfies the memory access.

Note that not all the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   executing a plurality of program threads at a processor, wherein executing the plurality of program threads comprises:
   fetching instructions of the plurality of program threads from an instruction buffer;
   storing the instructions at a respective plurality of scheduler buffer slots of a scheduler, wherein the plurality of scheduler buffer slots are assigned to respective program threads of the plurality of program threads; and
   scheduling the instructions to be executed at a processor core, comprising sending the instructions from the scheduler buffer slots to a processor core, wherein the instructions cause the processor core to generate a plurality of memory transactions targeted to a plurality of memory modules, the plurality of memory modules comprising memory modules having different access latencies; and
   in response to determining that a first memory transaction of the plurality of memory transactions is targeted to a first memory module, and in response to the first memory module having a first access latency that is longer than a second access latency of a second memory module of the plurality of memory modules, suspending execution of a first program thread of the plurality of program threads at the processor, wherein suspending execution of the first program thread comprises:
   releasing a plurality of scheduler buffer slots assigned to the first program thread for use in executing at least one other program thread of the plurality of program threads; and
   in response to releasing the plurality of scheduler buffer slots, preventing at least one instruction of the first program thread from being fetched from the instruction buffer during at least a portion of the first memory transaction.

2. The method of claim 1, further comprising:
   generating a second memory transaction of the plurality of memory transactions at a second program thread of the plurality of program threads; and
   in response to determining that the second memory transaction of the plurality of memory transactions is targeted to the second memory module, and in response to the second memory module having the second access latency that is shorter than the first access latency, maintaining execution of a second thread of the plurality of program threads.

3. The method of claim 1, further comprising:
   determining that the first memory transaction is targeted to the first memory module in response to determining that the first memory transaction is to be provided to a first level of a memory hierarchy associated with the processor.

4. The method of claim 1, further comprising:
   determining that the first memory transaction is targeted to the first memory module in response to a cache miss associated with the first memory transaction.

5. The method of claim 1, further comprising:
   determining that the first memory transaction is targeted to the first memory module based on a memory routing table, the memory routing table indicating memory addresses associated with the plurality of memory modules.

6. The method of claim 1, further comprising:
in response to receiving at the processor an indication of a response to the first memory transaction from the first memory module, resuming execution of the first program thread.

7. A method, comprising:
fetching, at an instruction fetch unit of a processor, an instruction of a first program thread;
storing, at a scheduler of the processor, the instruction in one of a plurality of scheduler buffer slots assigned to the first program thread;
providing, by the scheduler, the instruction to a processor core for execution;
determining, at the processor, that a first memory transaction generated by the first program thread is targeted to a first memory module of a first memory type that has a longer access latency than a second memory module of a second memory type; and
in response to determining that the first memory transaction is targeted to the first memory module, and in response to the first memory module having the longer access latency, suspending execution of the first program thread at the processor, wherein suspending execution of the first program thread includes releasing the plurality of scheduler buffer slots assigned to the first program thread.

8. The method of claim 7, wherein:
suspending execution of the first program thread further includes preventing the instruction fetch unit from fetching instructions of the first program thread.

9. The method of claim 7, further comprising:
determining, at the processor, that a second memory transaction generated by a second program thread is targeted to the second memory module of the second memory type; and
in response to determining that the second memory transaction is targeted to the second memory module, and in response to the second memory module having a shorter access latency than the first memory module, maintaining execution of the second program thread at the processor.

10. The method of claim 9, wherein the first memory type comprises a type of memory associated with relatively long access latency and the second memory type comprises a type of memory associated with relatively short access latency.

11. The method of claim 10, wherein the first memory type comprises random access memory (RAM) and the second memory type comprises flash memory.

12. The method of claim 9, wherein the first memory module and the second memory module are at a same level of a memory hierarchy associated with the processor.

13. The method of claim 9, wherein the first memory module and the second memory module are at different levels of a memory hierarchy associated with the processor.

14. A processor, comprising:
a processor core to execute a plurality of program threads and generate a plurality of memory transactions targeted to a plurality of memory modules, the plurality of memory modules comprising memory modules having different access latencies;
a memory controller to determine that a first memory transaction of the plurality of memory transactions is targeted to a first memory module of the plurality of memory modules having a first access latency;
a scheduler to receive instructions of the plurality of program threads and to provide the instructions to the processor core for execution, wherein the scheduler comprises a plurality of scheduler buffer slots to store instructions of respective threads of the plurality of program threads;
an instruction fetch unit to fetch the instructions of the plurality of program threads from an instruction buffer and to send the instructions to the scheduler; and
wherein the memory controller is to suspend execution of a first program thread of the plurality of program threads in response to the determination by the memory controller and in response to the first access latency being longer than a second access latency of a second memory module of the plurality of memory modules by signaling the scheduler to release a plurality of the scheduler buffer slots assigned to the first program thread for use in executing at least one other program thread of the plurality of program threads.

15. The processor of claim 14, wherein:
the processor is to generate a second memory transaction of the plurality of memory transactions when executing a second program thread of the plurality of program threads;
the memory controller is to determine that the second memory transaction of the plurality of memory transactions is targeted to the second memory module having the second access latency; and
wherein the memory controller is to maintain execution of the second program thread of the plurality of program threads in response to the determination by the memory controller that the second memory transaction is targeted to the second memory module and in response to the second access latency being shorter than the first access latency.

16. The processor of claim 14, wherein:
the memory controller is to determine that the first memory transaction is targeted to the first memory module in response to determining that the first memory transaction is to be provided to a first level of a memory hierarchy associated with the processor.

17. The processor of claim 14, wherein:
the memory controller is to determine that the first memory transaction is targeted to the first memory module in response to a cache miss associated with the first memory transaction.

18. The processor of claim 14, wherein:
the memory controller is to determine that the first memory transaction is targeted to the first memory module based on a memory routing table, the memory routing table indicating memory addresses associated with the plurality of memory modules.

19. The processor of claim 14, wherein:
the scheduler is to signal to the instruction fetch unit not to fetch instructions of the first program thread during at least a portion of the first memory transaction.

20. The processor of claim 14, wherein:
the processor core is to, in response to an indication of a response to the first memory transaction from the first memory module, resume execution of the first program thread.

* * * * *